United States Patent [19]
Davis

[11] 3,992,298
[45] Nov. 16, 1976

[54] DEWATERING MACHINE

[75] Inventor: Steven S. Davis, Bountiful, Utah

[73] Assignee: Envirotech Corporation, Menlo Park, Calif.

[22] Filed: Mar. 22, 1976

[21] Appl. No.: 669,129

Related U.S. Application Data

[63] Continuation-in-part of Ser. No. 588,257, June 19, 1975, which is a continuation of Ser. No. 519,893, Oct. 31, 1974, abandoned.

[52] U.S. Cl. ............................... 210/141; 210/138; 210/143; 210/401; 100/118
[51] Int. Cl.$^2$ ................... B01D 33/02; B01D 33/36
[58] Field of Search ........... 210/138, 141, 143, 297, 210/386, 400, 401; 100/118

[56] References Cited
UNITED STATES PATENTS

| | | | |
|---|---|---|---|
| 2,867,324 | 1/1959 | Hirs | 210/143 X |
| 3,317,052 | 5/1967 | Davis | 210/400 X |
| 3,375,932 | 4/1968 | Ishigaki | 210/401 X |
| 3,426,908 | 2/1969 | Davis | 210/401 |
| 3,704,788 | 12/1972 | Goodman | 210/401 |

*Primary Examiner*—John Adee
*Attorney, Agent, or Firm*—Robert E. Krebs; Thomas S. MacDonald

[57] ABSTRACT

A dewatering machine comprising an integral and cooperative combination of a vacuum filter of the rotary drum type and an expression device of the type wherein a diaphragm is pressed against a drainage deck. An intermittently-indexed first endless filter medium belt carries filter cake to the expression device after the cake is formed on the vacuum filter. A second endless filter belt is trained to run beneath the diaphragm of the expression device parallel to the drainage deck and above the first filter belt so that the filter cake is sandwiched between the two filter belts. The belt indexing action is coordinated with pressurization of the expression device so that the filter drum is indexed only when the diaphragm is relaxed and the pressurization is effected only at such times as the drum is not being indexed. The second filter belt prevents the pressed material from adhering to the diaphragm of the expression device.

6 Claims, 8 Drawing Figures

DEWATERING MACHINE

BACKGROUND OF THE INVENTION

This is a continuation-in-part of U.S. patent application Ser. No. 588,257 filed June 19, 1975 which, in turn, is a continuation of application Ser. No. 519,893 filed Oct. 31, 1974 and which is now abandoned.

FIELD OF THE INVENTION

This invention generally relates to an improved dewatering machine and, more particularly, to an integral machine for the filtration and expression of liquids from solids.

STATE OF THE ART

Various machines are known to mechanically dewater liquid-solid mixtures such as sewage and waste sludges in large-scale applications such as municipal wastewater treatment operations. One commonly used machine is a rotary drum vacuum filter which utilizes suction to draw liquid from a slurry though a porous filter medium. As conventionally operated, that type of machine produces solid cakes that are fairly moist because the applied pressure differential cannot exceed atmospheric pressure and the moisture content of some solids cannot be reduced below certain values at such pressure differentials even at the expense of prolonged treatment times. Centrifuges are also frequently used for dewatering solids but are not entirely satisfactory for dewatering sludges whose specific gravity approximates that of water itself. Filter presses and other types of expression devices are also sometimes used for sludge dewatering but they have capacity limitations, especially for very watery sludges.

There is a recognized need to provide sludge cakes which are substantially dryer than those which are conventionally produced. For instance, where sewage sludge is disposed of by means of incineration, increased cake dryness will reduce or obviate auxiliary fuel requirements to sustain combustion.

OBJECTS OF THE INVENTION

A primary object of the present invention is to provide an apparatus to dewater slurries and sludges in an economical and efficient manner.

A more specific object of this invention is to provide an apparatus for dewatering sludges and slurries such as are found in wastewater treatment operations.

BRIEF DESCRIPTION OF THE DRAWINGS

Further objects and advantages of the present invention can be readily ascertained by reference to the following description and appended drawings, which are offered by way of illustration only and not in limitation of the invention, whose scope is defined by the appended claims and equivalents to the structure, materials and acts recited therein. In the drawings:

DETAILED DESCRIPTION OF THE PREFERRED EMBODIMENT

Figures 1, 3:
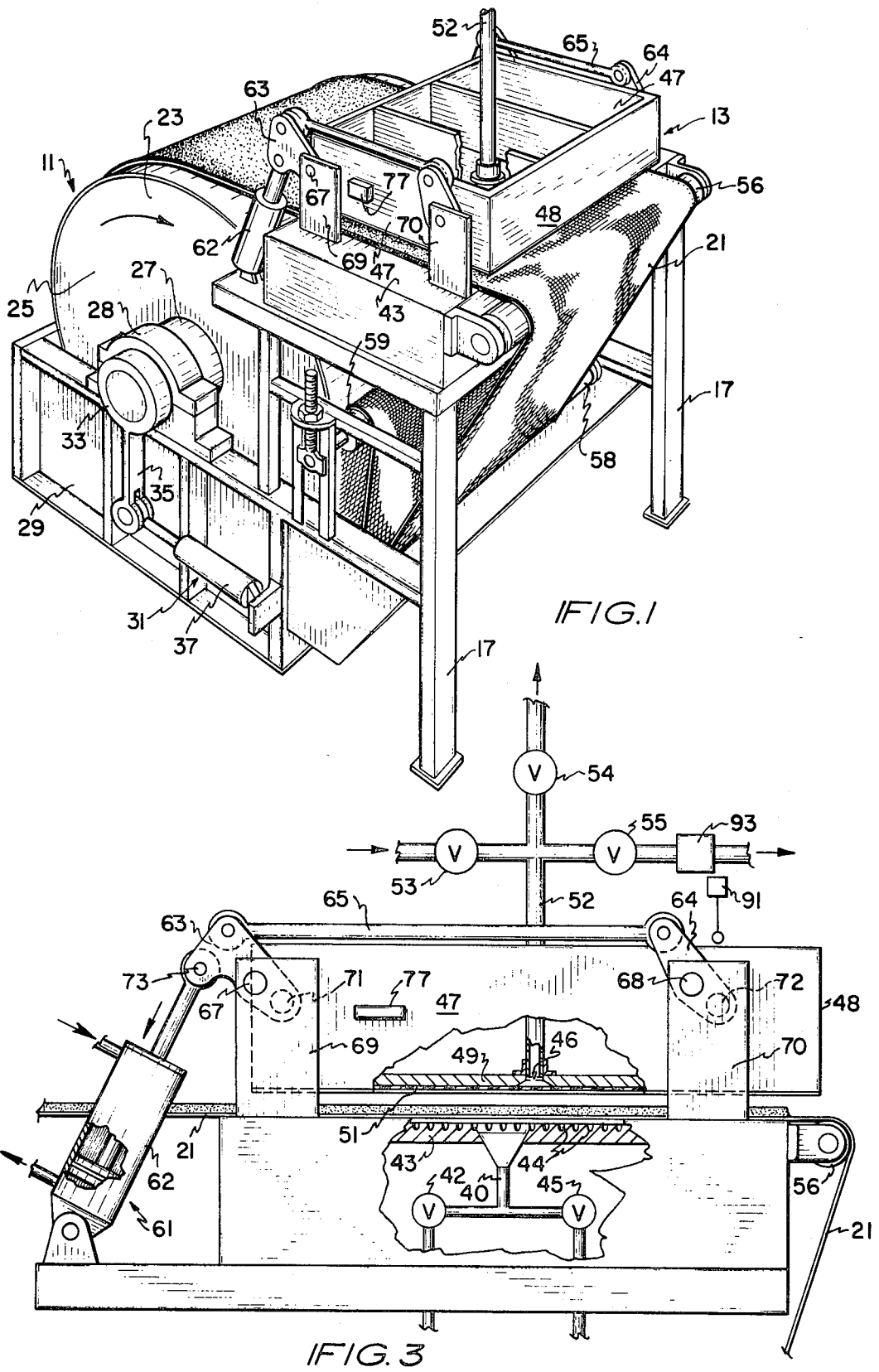
FIG. 1 is a pictorial view of the type of machine to which the present invention relates.
FIGS. 3 and 4 are detail views in elevation, enlarged and partially cutaway for purposes of clarity, of two positions of the expression device which forms a part of the machine of FIG. 1.
Figure 2:
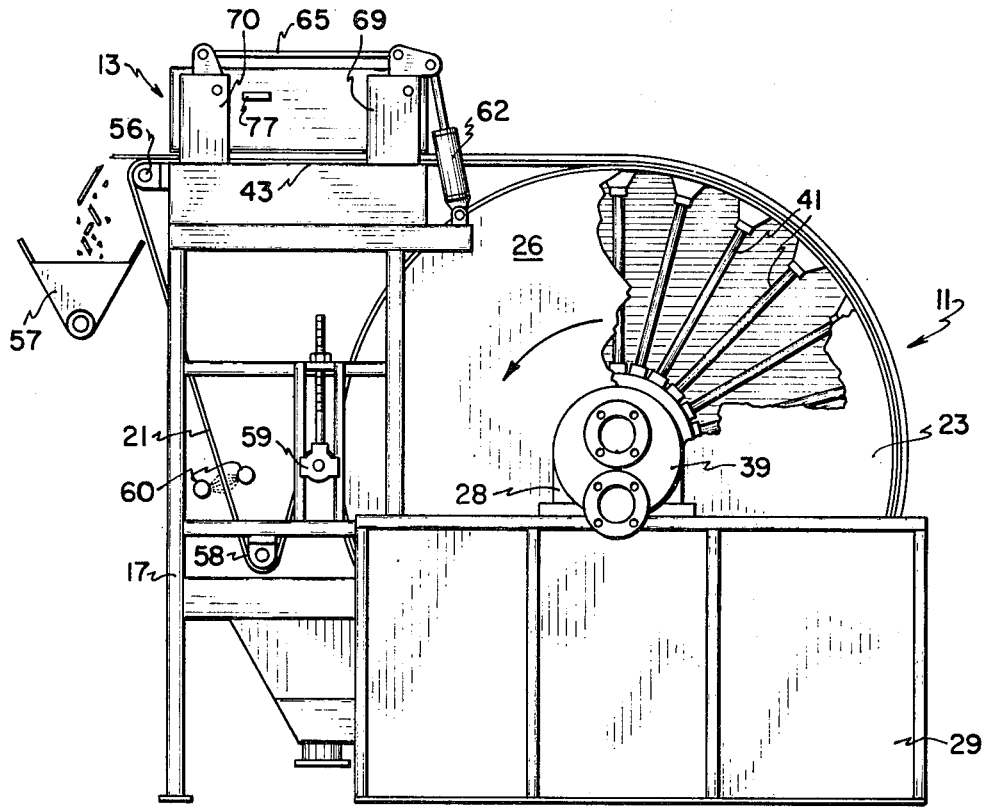
FIG. 2 is an elevational view of the opposite side of the machine of FIG. 1, partially cutaway for purposes of illustration.

The machine in FIGS. 1 and 2 generally includes an integral and cooperative combination of two dewatering devices, namely a vacuum filter 11 of the rotary drum type and an expression device 13 of the diaphragm type. A common frame 17 supports the two filtration devices and an endless belt 21 of porous filter medium is trained to carry a continuous sheet of filter cake to the expression device 13 after the cake is formed on the vacuum filter 11. In operation, the belt 21 is indexed intermittently as will be explained hereinafter in detail.

The illustrated rotary drum vacuum filter 11 is generally of conventional design and, as such, includes a hollow drum member 23 which is supported at its opposite endwalls 25 and 26 by axially-located trunnions 27. The trunnions extend outwardly and are supportively journaled by bearing assemblies 28 to position the drum 23 for rotation in a tank 29 that is adapted to hold slurry. A drive unit, generally designated 31 in FIG. 1, is operatively connected to intermittently index the drum 23 through a preselected angle of rotation following each cycle of the expression device so that sectors on the periphery of the drum pause successively in immersion in the slurry in the tank 29. In practice, the drum is indexed periodically about fifteen to thirty degrees in the direction indicated by the curved arrows. The illustrated drive unit 31 includes a ratchet wheel 33 fixedly secured to the drum trunnion 27 outboard of the support bearing assembly 28, a ratchet arm 35 arranged in engagement with the ratchet wheel, and a selectively extensible and retractable ram 37 that is pivotally connected to work the ratchet to rotate the drum. Alternatively, a conventional rotary drive unit can be employed; in that case, a short-duration power impulse is provided to the drive unit to initiate drum rotation and, after the drum turns a few degrees, rotation ceases because of friction.

As shown in FIG. 2, a two-port rotary valve 39 is concentrically arranged about the trunnion on the other endwall 26 of the filter drum 23 in fluid-flow communication with radially-extending filtrate conduits 41 disposed within the drum 23, which conduits lead to apertures that are formed in the sidewall of the drum. Such a structure is conventional. In operation, the rotary valve communicates in succession with the conduits 41 and serves as the means by which vacuum or suction is communicated to at least the submerged surface sectors of the drum. Filtrate which is drawn through the conduits 41 by the vacuum passes through the rotary valve and thence to discharge. In customary practice, vacuum is applied to a sector for a time after passage from the slurry to effectuate cake washing and drying.

The aforementioned filter belt 21 is trained about the sidewall of the drum 23 to cover at least the submerged sectors. The filter belt can leave the drum at top center as shown, or can be wrapped on the drum beyond that point. Filtrate which is drawn by vacuum from the slurry passes though the filter belt into the filtrate conduits 41 and, concomitantly, a cake of residual solids is built on the belt 21. The filter cake is carried out of the slurry when the drum 23 is indexed. The filter belt typically includes a thickened bean (not shown) along its edges which is used for alignment and tracking purposes.

Figure 4:
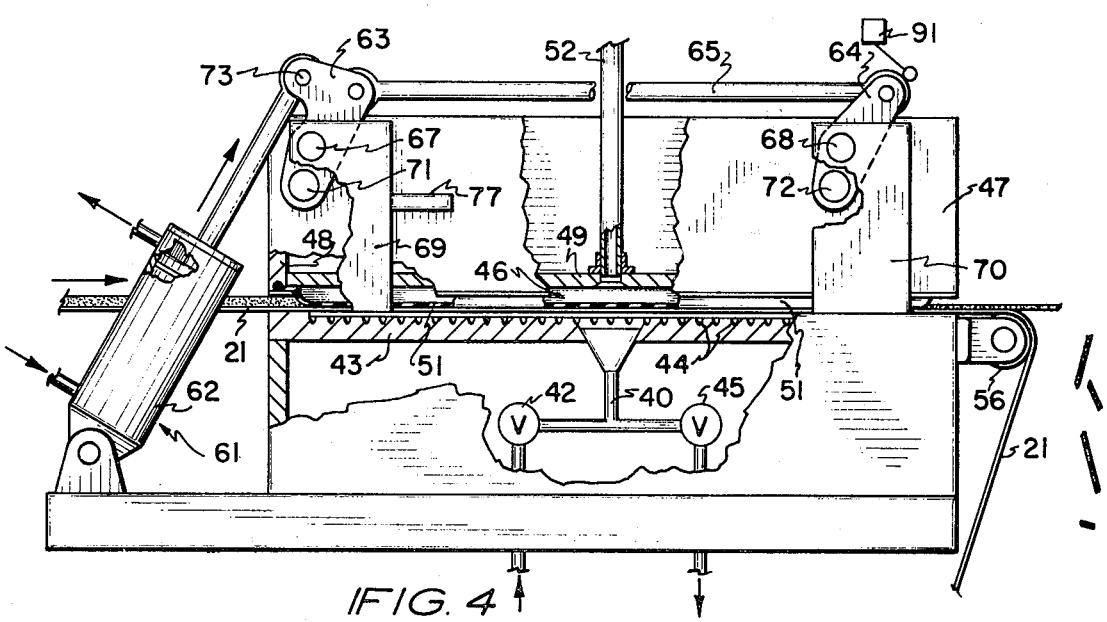

The aforementioned expression device 13 is positioned adjacent the drum 23 and includes a stationary drainage deck 43 constructed and arranged so that the filter belt 21 passes flatly thereover on its upper run. As shown in FIGS. 3 and 4, a system of interconnected apertures 44 is formed in the surface of the drainage deck 43 beneath the run of the filter belt 21 to allow filtrate to pass through the deck for collection and discharge via a conduit 40. A first valve 45 is interposed in the conduit 40 and is connected to the aforementioned vacuum source which is used here to draw or sweep filtrate through the drainage deck. A second valve 42 is provided to connect the conduit 40 to a source of pressurized air; by opening the valve 42, pressurized air is passed upwardly through the apertures 44 in the drainage deck 43 to aid in disengaging the filter belt 21 from the deck.

The expression device 13 further includes structure defining an air-tight plenum chamber 36 that is spaced above the drainage deck 43 with the filter belt passing therebelow. In the embodiment illustrated in FIGS. 3 and 4, the plenum chamber structure includes rigid upstanding sidewalls 47 and endwalls 48 that define a continuous box-like enclosure. A rigid plate 49 is sealingly fitted between the walls 47 and 48 to form an upper closed end for the chamber 46. A flexible impervious diaphragm 51 is sealingly fitted beneath the plate 49 to face the drainage deck 43 and to complete the plenum chamber.

As shown in FIG. 3, a conduit 52 is connected in fluid-flow communication with the interior of the plenum chamber. A first valve 53 is connected to the conduit 52 for passing pressurized air into the chamber 46 to distend the diaphragm 51 downwardly to press against the filter cake on the belt 21 overlying the drainage deck 43. The pressure of the diaphragm expresses liquid from the filter cake and such liquid is carried to discharge via the drainage apertures 44, conduit 40 and valve 45.

A second valve 54 is connected to the conduit 52 to exhaust air from the plenum chamber 46. A third valve 55 connects the conduit 52 to a vacuum source to further evacuate chamber 46 and to retract the diaphragm 51. With the diaphragm drawn upwardly against the plate 49, there is substantial clearance therebelow so that a fairly thick cake of solids can be carried onto the drainage deck 43 by the filter belt 21.

Preferably, the diaphragm 51 is slightly wider than the area of cake formation on the filter belt 21 in order to accomodate some lateral expansion of the cake during the pressing operation. The length of the diaphragm and drainage deck in the direction of filter belt travel is determined by the filter drum index angle and by the drum diameter; the machine is designed and operated such that all sections of filter cake carried by the belt are subject to expression.

Following retraction of the diaphragm 51, the filter belt 21 is indexed and the expressed cake is discharged as the belt travels around a discharge roller 56. A scraper assembly could also be utilized. As shown in FIG. 2, the discharged solids are carried by a conveyor 57 or the like to disposal, say by incineration. Following discharge of the filter cake, the filter belt 21 passes over an idler roller 58 and then over a selectively positionable takeup roller 59. The belt is normally washed by liquid spray from pipes 60 prior to reengagement with the drum 23 and re-entry into the slurry in the tank 29.

During expression, it has been found that the diaphragm 51 has a tendency to expand laterally as well as downwardly. In the extreme case, the diaphragm could "blow out" sideways in the space beneath the lower edges of the plenum walls 47 and the drainage deck 43. To preclude that, the assemblage shown in detail in FIGS. 3 and 4 can be provided whereby the plenum chamber structure is reciprocatively mounted and an actuating mechanism 61 is provided to move the structure downwardly prior to the expression operation in order to minimize the lateral area into which the diaphragm can expand. The particular illustrated actuating mechanism 61 includes, on each side of the expression device, a conventional extensible-retractable hydraulic or pneumatic piston assembly 62 having one end fixed to the machine frame 17 and the other end pivotally connected to linkage which supports the plenum chamber 46. The illustrated linkage comprises associated short links 63 and 64 connected together on each side of the plenum chamber 46 by a crossmember 65; the links are respectively connected at pivots 67 and 68 to associated stationarily fixed support legs 69 and 70 and at pivots 71 and 72 to the plenum structure 46. The piston assemblies 62 are connected to the links 63 at pivots 73. In operation, extension of the piston assemblies 62 rotates the links 63 and 64 clockwise from the position shown in FIG. 3 to the position in FIG. 4. Rigid stop members 77 are fixedly mounted to the sides 47 of the plenum chamber in a position to abutt the support legs 69 when the expression device is closed. With respect to FIG. 4, it may be noted that the stop member 77 and the plenum-to-link pivots 71 and 72 are on opposite sides of a vertical line through the pivot 67; accordingly, the reactive upward force on the plenum chamber during expression is borne by the stop members 77 and not the piston assemblies 62.

Figure 5:
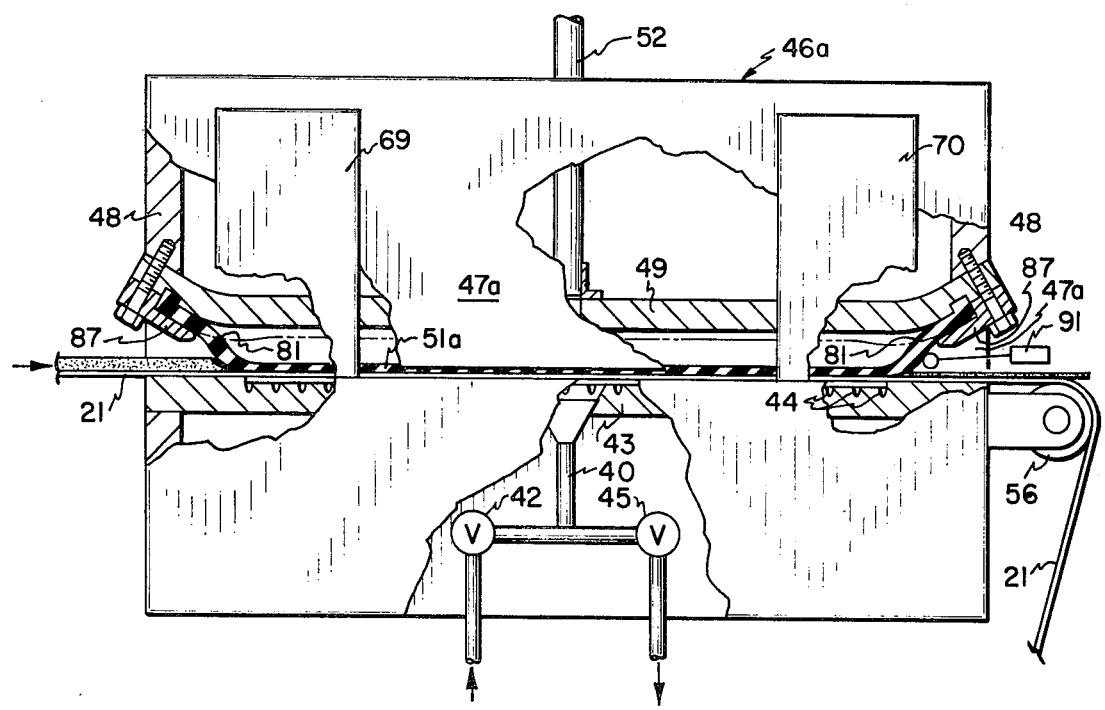
FIGS. 5 and 6 are detail views, in elevation and enlarged for purposes of clarity of alternative modifications of the expression device shown in FIGS. 3 and 4.

FIG. 5 shows an alternative embodiment of the plenum chamber structure, generally designated 46a, for usage in cases where the filter cake is quite thin. In this embodiment, the plenum chamber structure is stationarily fixed by the support legs 69 and 70 close to the drainage deck 43 so that there is only a few centimeters clearance for the introduction of cake onto the deck when a modified diaphragm 51a is retracted upwardly. The modified diaphragm 51a differs from the previously-described one insofar as the edges 81 which extend transversely across the inlet ends of the press are substantially thicker than the rest of the diaphragm. Clamping strips 87 secure the diaphragm to the plenum chamber in a manner which provides support next to the thickened edges 81 to prevent diaphragm blowouts at the press inlet and outlet. Also in this embodiment, plenum chamber sidewalls 47a extend downwardly parallel to the edges of the filter belt which passes therebelow with the beads on the edges of the filter belt lying outside the walls. The extended walls 47a prevent the diaphragm from blowing out from the sides of the press during the expression operation. The retracted position of the diaphragm 51a is shown by the phantom lines in FIG. 5 and the position during the expression operation is shown by solid lines. Aside from the above-mentioned differences, the expression device shown in FIG. 5 is structurally and functionally substantially the same as the one shown in FIGS. 1–4 and similar parts are given the same reference numerals.

Figure 6:
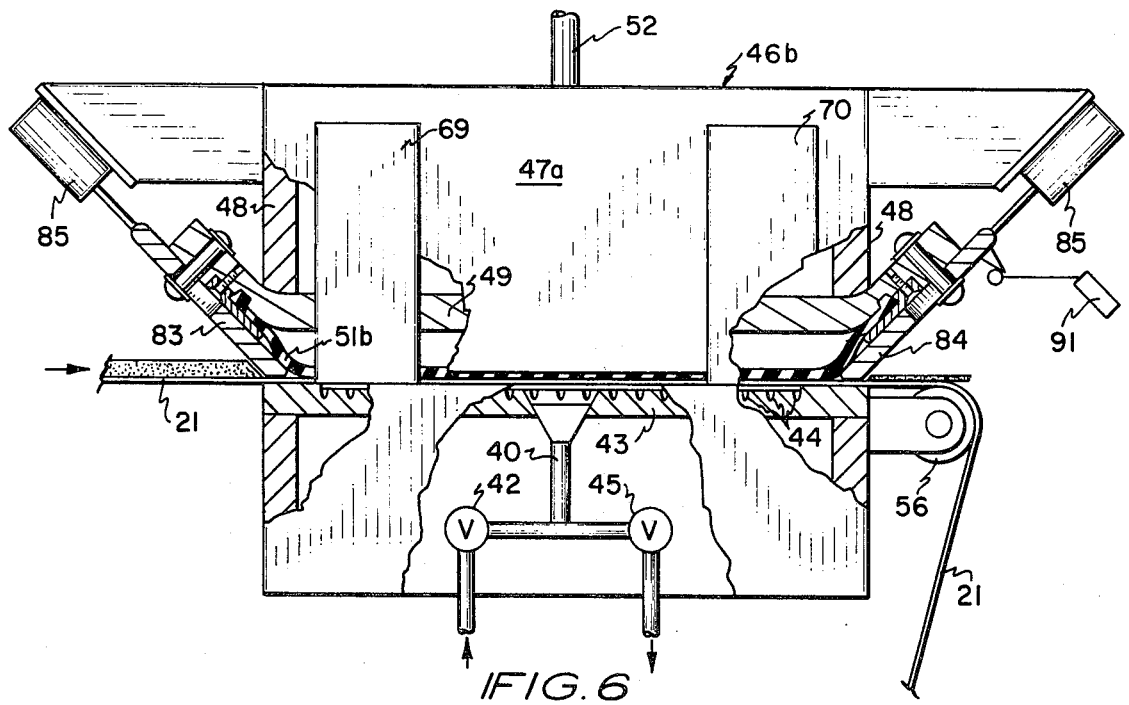

FIG. 6 shows yet another alternative embodiment of the plenum chamber structure, here generally designated 46b. In similarity with the FIG. 5 arrangement, the plenum chamber structure is stationarily fixed by the support legs 69 and 70 and the plenum sidewalls 47a extend downwardly substantially below plate 49. In this embodiment the diaphragm edges are not thickened as are those of diaphragm 51a in FIG. 5 and, instead, the diaphragm 51b in this figure is similar to 51 in FIGS. 1–4. The distinctive feature here is that closure walls or shoes 83 and 84 are mounted for selective positioning by reciprocatable piston assemblies 85 to close the inlet and outlet ends of the press, respectively, to retain the diaphragm 51b. In operation, the closure walls 83 and 84 are held in the raised or elevated position by the piston assemblies 85 whenever the filter belt 21 is indexed to carry filter cake into the press or to discharge expressed solids. During expression, the walls 83 and 84 are forced downward across the inlet and outlet ends of the press to retain the diaphragm 51b. Aside from the above-mentioned differences, the expression device shown in FIG. 6 is also structurally and functionally substantially the same as the one shown in FIGS. 1–4 and similar parts are given the same reference numerals.

Figure 8:
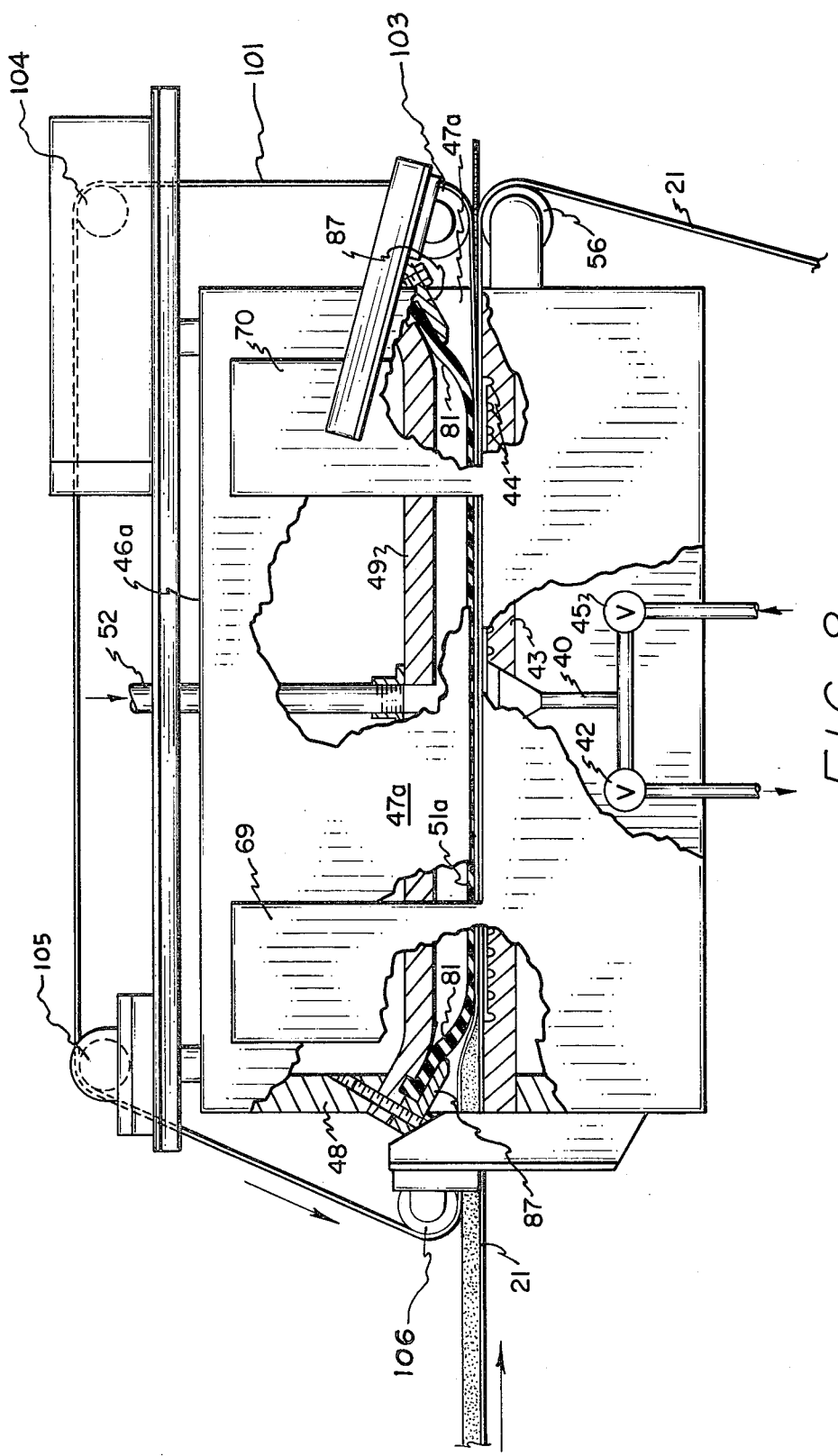
FIG. 8 is a detail view in elevation and enlarged for purposes of clarity of the expression device of FIG. 5 modified according to the present invention.

In FIG. 8, there is shown the stationary plenum chamber structure 46a of FIG. 5 in combination with a second endless traveling filter belt 101. More particularly, the filter belt 101 has a width about the same as the main filter belt 21 and is trained to encircle the plenum chamber structure 46a and to run beneath the diaphragm 51a parallel to the drainage deck 43 above the main filter belt 21. In the specific illustrated embodiment, the filter belt 101 travels about guide rollers 103–106 which are rotatably supported from the stationary plenum chamber 46a. In operation, the filter cake which enters the zone below the diaphragm 81 is pressed between the main filter belt 21 and the second belt 101 by the diaphragm 81. Then when the belt 21 is indexed, the belt 101 moves in the same direction due to adherence between it and the pressed material. As the pressed material moves out from beneath the plenum chamber structure 46a, the material peels away from the belt 101. (In FIG. 8, this would occur at the right-hand end of the press.) The second filter belt 101 is preferably utilized when the filtered materials produce a sticky cake, such as is the case with certain sewage sludge, which would adhere to the pressing diaphragm 81 in the adsence of the second filter belt. It should be clearly understood that the second endless filter belt can be utilized in combination with plenum chamber structures other than the specifically illustrated one.

Figure 7:
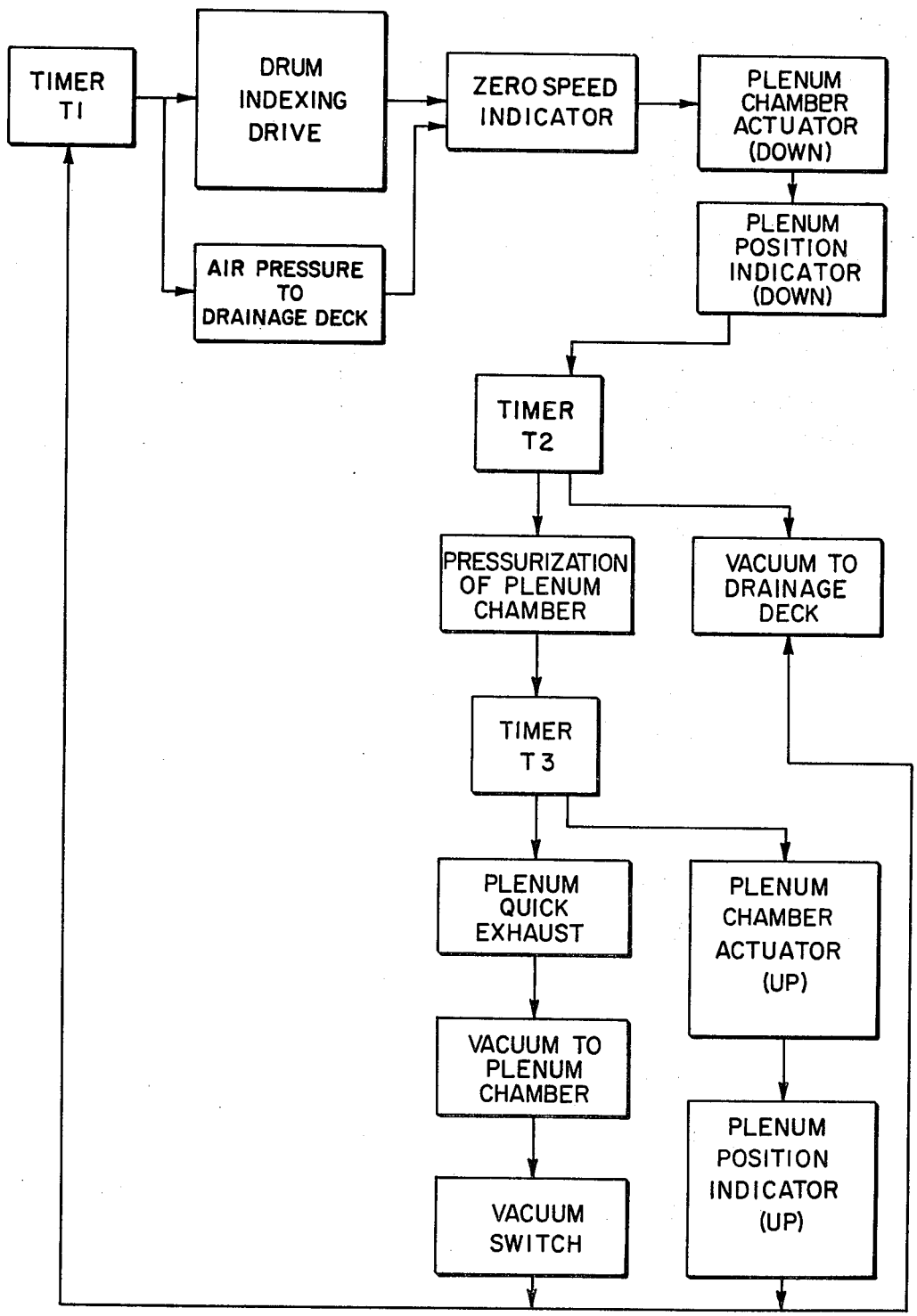
FIG. 7 is a schematic block diagram of a control system for the machine of FIG. 1.

An operating sequence of the machines embodied in FIGS. 1–4 and 8 can be best understood by reference to FIG. 7. A cycle of a machine is initiated by actuation of the drum drive 31 for a time determined by a conventional timer T1, which actuation indexes the drum 23 a fraction of a revolution to advance the filter belt 21 to carry filter cake out of the slurry in the tank 29 and onto the deck 43 of the expression device 13. During the time the filter belt is being indexed, the diaphragm 51 is in the retracted or raised position, drainage valve 45 is closed, and the valve 42 is open so that compressed air is directed upward through the apertures 44 in the drainage deck 43 to free the filter belt from the deck. After expiration of the timing period determined by the timer T1, the air valve 42 is closed. The completion of the belt indexing action can be conveniently sensed by a conventional zero speed switch or indicator 89 that is associated with the belt support roller 56 to determine rotation thereof. Once the filter belt 21 has come to a complete stop, the zero speed indicator 89 permits the energization of the actuating mechanism 61 which moves the plenum chamber 43 downwardly toward the drainage deck 43. (In the FIG. 6 embodiment the corresponding function would be to move walls 83 and 84 downwardly by extending the cylinders 85.) The lowermost position of the plenum chamber is conveniently sensed by a conventional limit or microswitch 91 which then permits several functions to occur. First, valve 53 is opened to charge the plenum chamber 46 with compressed air to distend the diaphragm 51 downwardly to express liquid from the filter cake on the filter belt 21 overlying the drainage deck 43. The expression continues for a period of time determined by the timer T2 and during that time the valves 54 and 55 are in a closed position. Concurrently, vacuum is communicated to the drainage deck via the valve 45 to sweep liquid through the deck. After expiration of the time period set by timer T2, plenum pressurization is stopped by closing the valve 53 and then the valve 54 is opened to exhaust the plenum chamber 46 for a relatively short period determined by a timer T3. Following the expiration of the timing period of timer T3, the valve 54 is closed and vacuum is communicated to the chamber by opening the valve 55 in order to complete the evacuation of the chamber and to retract the diaphragm 51 upwardly into the plenum chamber 46. During the timing period of the timer T3, the actuating mechanism 61 moves the plenum chamber 46 upwardly and vacuum is continuously applied to the drainage deck 43 to hold the filter belt and expressed solids in place. The completion of the retraction of the diaphragm is sensed by a conventional vacuum switch 93 utilized in conjunction with the valve 55 to sense a preselected pressure differential with respect to atmospheric pressure. The raising of the plenum chamber 46 is sensed by the aforementioned microswitch 91. If both switches indicate that the associated functions are accomplished, the application of vacuum to the drainage deck 43 is stopped by closing the valve 45. Following that, the pressurized air valve 42 is again opened to loosen the filter belt from the drainage deck and the filter drum 23 is again indexed by the drive unit 31 to begin another operating cycle.

The vacuum filter 11 and the expression device 13 can be coordinately operated with control devices other than those described in the preceding, which are offered by way of example only, so long as the filter drum is indexed only when the diaphragm is generally relaxed and the plenum chamber is pressurized only at such times as the filter drum is not being indexed.

Although the vacuum filter described hereinbefore is of the rotary drum type, other types can be utilized in accordance with the present invention. For example, the vacuum filter can be of the conventional horizontal type which carries a traveling filter belt.

I claim:

1. An integral machine for filtering and dewatering solids from a slurry comprising:

a. a vacuum filter constructed and arranged to filter solids from a slurry;
b. a first endless belt of filter medium trained about said vacuum filter so that vacuum applied by said vacuum filter causes a cake of solids from the slurry to build upon said first endless belt;
c. an expression device inclusive of:
  i. drainage means supported and arranged to present a drainage deck over which said first belt passes;
  ii. a plenum chamber structure supported above said drainage means and having an open end which substantially encompasses the area directly above said drainage means;
  iii. a flexible impervious diaphragm which is sealingly fixed across said open end of said plenum chamber structure in face-to-face relationship with said drainage deck and spaced apart therefrom in a relaxed position;
  iv. a second endless belt of filter medium and means training said second endless belt to encircle said plenum chamber structure and to run beneath said diaphragm parallel to said drainage deck above said first endless belt;
  v. pressurizing means in fluid-flow communication with said plenum chamber structure for selectively applying fluid pressure against said diaphragm to urge the same from the relaxed position to a distended position whereat said diaphragm exerts pressure against a cake of solids on a section of said first endless belt overlying said drainage deck to express liquid from said cake of solids; and
d. indexing means operatively connected to said vacuum filter for intermittently indexing said filter medium belt so that said belt carries solids cake from said slurry onto said drainage deck, said pressurizing means and said indexing means being cooperatively operative such that said drum is indexed only when said diaphragm is relaxed and such that said pressurizing means applies pressure against said diaphragm only at such times as said drum is not being indexed.

2. A machine according to claim 1 wherein said drainage deck has a system of interconnected drainage apertures formed therethrough for collecting liquid expressed through said filter medium belt.

3. A machine according to claim 2 inclusive of means arranged in fluid-flow communication with said drainage aperture system for drawing expressed liquid through said apertures.

4. A machine according to claim 3 further inclusive of means in fluid-flow communication with said drainage aperture system for forcing gas upward therethrough to release said filter belt from said drainage deck during such times as said diaphragm is in said relaxed position.

5. A machine according to claim 1 wherein said plenum chamber structure is mounted for reciprocative movement and said means training said second endless belt are mounted to said plenum chamber structure and including reciprocating means connected to said plenum chamber structure to selectively move the same towards and away from said drainage deck.

6. A machine according to claim 5 wherein said means for reciprocatively moving said chamber structure includes an extensible-retractable piston assembly.

* * * * *